Aug. 11, 1964
B. C. HAMLET
3,144,246
SPRING SUSPENSION ASSEMBLY WITH
ADJUSTABLE SEAT FOR RADIUS LEAF
Filed July 25, 1953
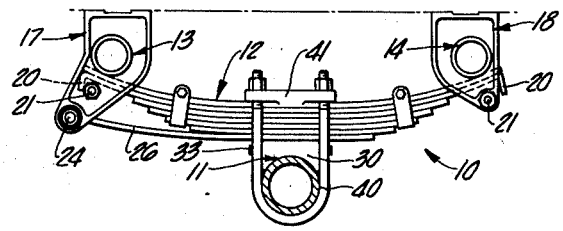
FIG. 1.
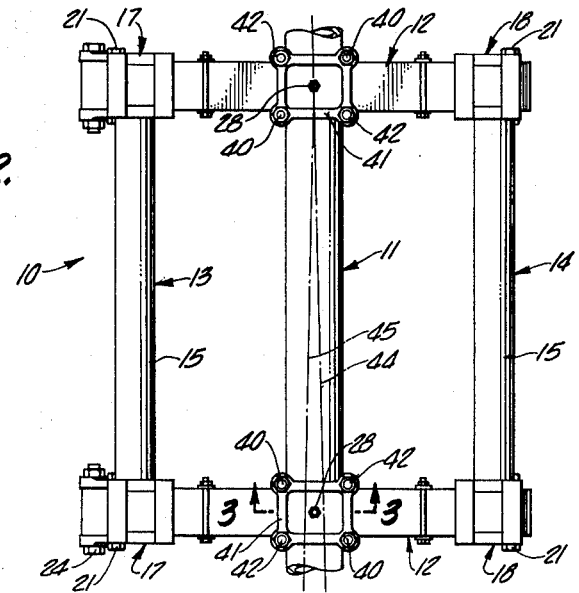
FIG. 2.
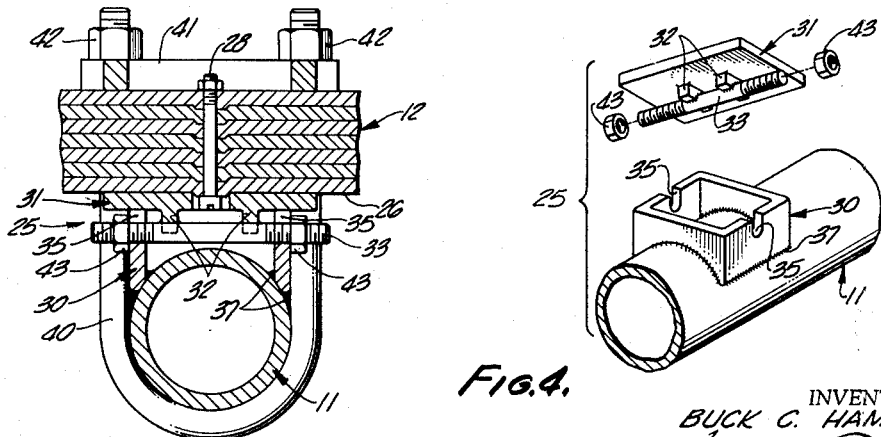
FIG. 3.
FIG. 4.
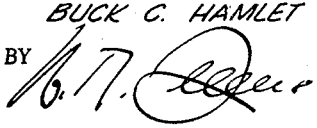
INVENTOR.
BUCK C. HAMLET
BY
ATTORNEY 3,144,246
SPRING SUSPENSION ASSEMBLY WITH ADJUSTABLE SEAT FOR RADIUS LEAF
Buck C. Hamlet, La Habra, Calif., assignor to Western Unit Corporation, City of Industry, Calif., a corporation of California
Filed July 25, 1963, Ser. No. 297,496
2 Claims. (Cl. 267—52)

This invention relates to spring suspension assemblies for use on vehicles and more particularly cargo trucks and trailers and features an adjustable connection for a radius leaf advantageously used with floating spring beam assemblies.

In a typical floating type spring beam suspension assembly the carriage axle is attached to the midportion of the spring beams and the outer ends of the latter are floatingly held captive within hanger brackets fixed to the chassis frame.

Draft loads are customarily transmitted to the axle substantially independent of the spring beams themselves and in various ways including a radius leaf having its forward end attached to the forward hanger and its rear end secured to the spring seat assembly. Such radius spring leaves provide for desirable resiliency in the draft connection but, as heretofore made, lack provision for highly desirable adjustments to compensate for various manufacturing tolerances, misalignment in the assembly of the components and, in particular, for properly aligning the axle to lie normal to the longitudinal center line of the chassis.

To obviate the disadvantages and objections to prior constructions in respects broadly referred to above there is provided by the present invention a simple, rugged, versatile, and readily adjusted connection between the carriage axle and the radius spring leaf. The invention assembly comprises a two-part spring seat one component of which is firmly clamped to the carriage axle and the other component of which is immovably secured to the spring beam and to the radius leaf in a manner permitting adjustment of these spring members transversely of the axle. Desirably only one such adjustable assembly is required for each carriage since the principal objective is to provide means for pivoting one end of the axle either forwardly or backwardly sufficiently to bring it back into perpendicularity with the longitudinal center line of the chassis. Once this has been accomplished the adjustable members are firmly locked in adjusted position.

Accordingly it is the primary object of the present invention to provide an improved spring suspension for a vehicle carriage featuring an adjustable radius leaf connection between the carriage axle and the chassis frame.

Another object of the invention is the provision of a simple, rugged, highly effective and efficient adjustable spring seat assembly.

Another object of the invention is the provision of an adjustable spring seat assembly for use in combination with a radius spring leaf draft member of the type commonly employed with floating spring beam suspension assemblies.

These and other more specific objects will appear upon reading the following specification and claims and upon considering in connection therewith the attached drawing to which they relate.

Referring now to the drawing in which a preferred embodiment of the invention is illustrated:

FIGURE 1 is a side elevational view, partly in cross section, showing one preferred embodiment of the present invention;

FIGURE 2 is a top plan view of FIGURE 1;

FIGURE 3 is a vertical sectional view on an enlarged scale taken along line 3—3 on FIGURE 2 showing constructional details of the adjustable spring seat assembly; and FIGURE 4 is an exploded perspective view of the components of the spring seat assembly, per se.

Referring to FIGURES 1 and 2, there is shown a typical embodiment of the invention in association with a floating type spring beam suspension assembly comprising a carriage axle 11, a pair of spring beams 12, 12 clamped to the axle and a pair of forward and rear bracket assemblies 13, 14 rigidly secured to the sides of a chassis frame (not shown). The hanger assemblies include spacer tubes 15 having their opposite ends extending through and firmly secured, as by welding, to sets of hanger bracket castings 17, 18. The lower sides of each of these brackets is bifurcated in known manner to seat over and straddle the opposite ends of spring beams 12, 12. Normally the opposite ends of one of the longer leaves of these beams is bent downwardly as indicated at 20 to engage over the midportion of a retainer bolt 21 supported in the legs of the brackets. Normally, as is readily understood by persons skilled in this art, ends 20 do not engage retainer bolts 21 except under extreme operating conditions.

Forward hangers 17, 17 have their inner and outer sides extending downwardly further than the corresponding sides of the rear hangers and support an assembly bolt 24 therein about which the forward end of radius spring leaf 26 is curled. The rear end of the radius leaf underlies the midportion of the spring beam 12 and is rigidly connected to the latter beam as by a through bolt 28 (FIG. 3).

The described spring beam and radius leaf 26 are clamped to carriage axle 11 by an adjustable seat assembly 25 forming an important feature of the present invention and now to be described with reference to FIGS. 1, 3, and 4.

As is best shown in FIG. 4 a spring seat assembly 25 comprises a generally rectangular ring-like main body 30 and an adjustable plate 31 of the same general shape but having an area appreciably larger than that of ring 30. The underside of plate 31 is provided with a pair of bosses 32 to which is rigidly welded the midportion of a member 33 threaded on its opposite ends. The diametrically opposed sides of ring 30 are notched from their upper edges as indicated at 35 to receive and seat threaded member 33. The lower edges of ring 30 are arcuate shaped and contoured to seat firmly against the upper side of axle 11 to which it is rigidly secured by welding 37.

The spring beams are clamped to the opposite ends of axle 11 in the manner illustrated in FIGS. 2 and 3. The clamping assembly for this purpose includes a pair of identical U-bolts 40 embracing the axle and spaced closely beside the inner and outer sides of the spring beams. The upper threaded ends of these U-bolts extend through a pressure pad 41 lying against the upper side of the spring beams. Tightening of nuts 42 serves to clamp the entire assembly to the carriage axle.

Before tightening nuts 42 it is desirable to adjust the two components of seat adjusting assembly 25. Normally this is accomplished by first clamping spring beam 12 locking the adjustable seat to one end of the axle. Let it be assumed that this is the upper one of the spring beams shown in FIG. 2 and that lower spring beam assembly is provided with the adjustable seat shown in FIG. 4. With the parts in the positions shown in FIG. 3, nuts 42 are left loose and nuts 43 are removed so that the adjacent end of the axle can be shifted either forwardly or rearwardly through a short arc until it is determined that the center line of axle 11 lies truly normal to the center line of the chassis frame. Dot and dash lines 44, 45 in FIG. 2 indicate generally the range of arcuate movement of the axle forwardly and rearwardly about a pivot point provided through the vertical axis of bolt 28 in the tightly clamped upper spring beam 12. Once the proper position of the axle has been determined, nuts 43 of the spring seat assembly are firmly tightened and a pair of lock nuts is desirably added to the outer ends of threaded member 33 to securely lock the parts in this adjusted position. Thereafter nuts 42 for both U-bolts 40 are firmly tightened.

From the foregoing and from a consideration of FIG. 1, it will be appreciated that the weight of the frame and the cargo carried thereon is transmitted through hangers 17 and 18 and through the transverse tubes 13 and 14 to bear against the upper outer ends of the spring beam 12. This is solely a floating friction connection since the downturned hooked ends 20 of one of the spring leaves is normally out of contact with the keeper or retainer bolts 21. It will therefore be understood that the draft load applied to the vehicle is transmitted through brackets 17 and radius spring leaves 26 to the axle by way of U-bolts 40 and the adjustable spring seat assembly 25. If at any time the parts get out of adjustment it is merely necessary to loosen the clamping bolts and to readjust nuts 43 of the spring seat assembly.

While the particular spring suspension assembly with adjustable seat for radius leaf shown and disclosed in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims.

I claim:

1. A unitary carriage spring suspension assembly preadjusted and in readiness to be rigidly secured to a chassis frame in the field by semiskilled workmen unlikely to be familiar with the importance of alignment between components of such spring suspension components, said assembly having a carriage axle, a pair of spring beams extending parallel to one another transversely of the opposite ends of said carriage axle, hanger means having a floating connection with the opposite ends of said spring beams, and each having mounting surfaces adapted to be rigidly secured to the opposite sides of a vehicle frame, the forward ones of said hanger means including as a unitary rigid part thereof rigid spacer tube means extending transversely of said assembly, a pair of radius members underlying and extending lengthwise of the forward ends of said spring beams, means pivotally connecting the forward ends of said radius members to the forward ones of said hanger means at points underlying the forward ends of said spring beams and providing a draft connection between said hanger means and said radius members, separate coupling means for rigidly connecting the opposite ends of said carriage axle to the midportions of said spring beams and to the rear ends of the associated radius members, at least one of said coupling means including adjustable means operable to align the forward one of said spacer tubes to lie parallel to said carriage axle before said coupling means is tightened to clamp said spring beams and carriage axle fixedly assembled to one another, said adjustable means comprising two parts in sliding contact with one another and sandwiched between said carriage axle and overlying contacting portions of one spring beam and the rear end of one radius member, means for adjusting said two parts crosswise of their contacting surfaces as necessary to bring said spacer tube means into parallelism with said carriage axle, and both of said coupling means then being rigidly clampable to hold said carriage axle rigidly clamped to said spring beams and to the rear ends of said radius members, one of the two parts of said adjustable means being welded to said carriage axle, the other of said parts being slidable transversely of said one part and of said axle, an elongated member threaded at its opposite ends and having its midportion welded to the underside of the other of said parts, said threaded ends being seated loosely in openings in the forward and rear sides of said one part, and nut means on the exposed outer threaded ends of said elongated member adapted to be adjusted as necessary to hold said two parts in a desired adjusted position with said spacer tube means parallel to said carriage axle.

2. A unitary carriage spring suspension assembly as defined in claim 1 characterized in that said radius members are flat spring leaf members having their forward ends curled into loops embracing pivot bolt means holding the same assembled to said forward hanger means, and said radius members having their rear ends underlying the midportions of said spring beams and rigidly secured thereto.

References Cited in the file of this patent

UNITED STATES PATENTS

| | | |
|---|---|---|
| 1,802,451 | Summers | Apr. 28, 1931 |
| 1,833,405 | Back et al. | Nov. 24, 1931 |
| 2,139,113 | Cline et al. | Dec. 6, 1938 |
| 2,626,144 | Stephen | Jan. 20, 1953 |
| 2,741,491 | Van Raden | Apr. 10, 1956 |
| 2,746,313 | Roubal | May 22, 1956 |
| 2,988,352 | Massar | June 13, 1962 |